United States Patent
Breidenbach

[11] Patent Number: 6,105,545
[45] Date of Patent: Aug. 22, 2000

[54] INTAKE PORT FOR AN INTERNAL COMBUSTION ENGINE

[75] Inventor: Paul Breidenbach, Bechenheim, Germany

[73] Assignee: General Motors Corporation, Detroit, Mich.

[21] Appl. No.: 09/248,748

[22] Filed: Feb. 12, 1999

[51] Int. Cl.[7] .................................................. F02M 35/00
[52] U.S. Cl. ........................................................ 123/184.56
[58] Field of Search .............................. 123/184.56, 403

[56] References Cited

U.S. PATENT DOCUMENTS

| | | | |
|---|---|---|---|
| 3,875,918 | 4/1975 | Loynd | 123/184.56 |
| 4,928,638 | 5/1990 | Overbeck | 123/184.56 |
| 5,216,985 | 6/1993 | Brummer et al. | 123/184.56 |
| 5,662,086 | 9/1997 | Piccinini | 123/403 |
| 5,722,358 | 3/1998 | Fuesser et al. | 123/184.56 |
| 5,797,365 | 8/1998 | Kim | 123/184.56 |

FOREIGN PATENT DOCUMENTS

| | | |
|---|---|---|
| 3518684 C2 | 6/1987 | Germany . |
| 4445412 C2 | 11/1998 | Germany . |
| WO 96/26356 | 8/1996 | WIPO . |
| WO 97/08433 | 3/1997 | WIPO . |

OTHER PUBLICATIONS

JP 60–159332, *Patent Abstracts of Japan*, M–441, vol. 9, No. 326, Dec. 21, 1985.

*Primary Examiner*—Marguerite McMahon
*Assistant Examiner*—Jason Benton
*Attorney, Agent, or Firm*—Karl F. Barr, Jr.; Michael J. Bridges

[57] ABSTRACT

An inlet port for a spark-ignition reciprocating-piston internal combustion engine is provided with means for altering the direction of approach flow of the conducted gas to an inlet valve leading to a combustion chamber for producing a desired swirling of the charge selectively in the combustion chamber. The means consists of an expansion body which is arranged asymmetrically on the wall of the inlet port, consisting of a supporting body abutting against the wall and an elastomer portion connected to the latter at the edges gas-tightly and liquid-tightly. The expansion body can be expanded through a connection piece by pumping in a fluid so that it forms a ramp which predetermines the direction of approach flow of the conducted gas to the inlet valve. The cross-section of the inlet port is not impaired when the ramp is not required.

4 Claims, 2 Drawing Sheets

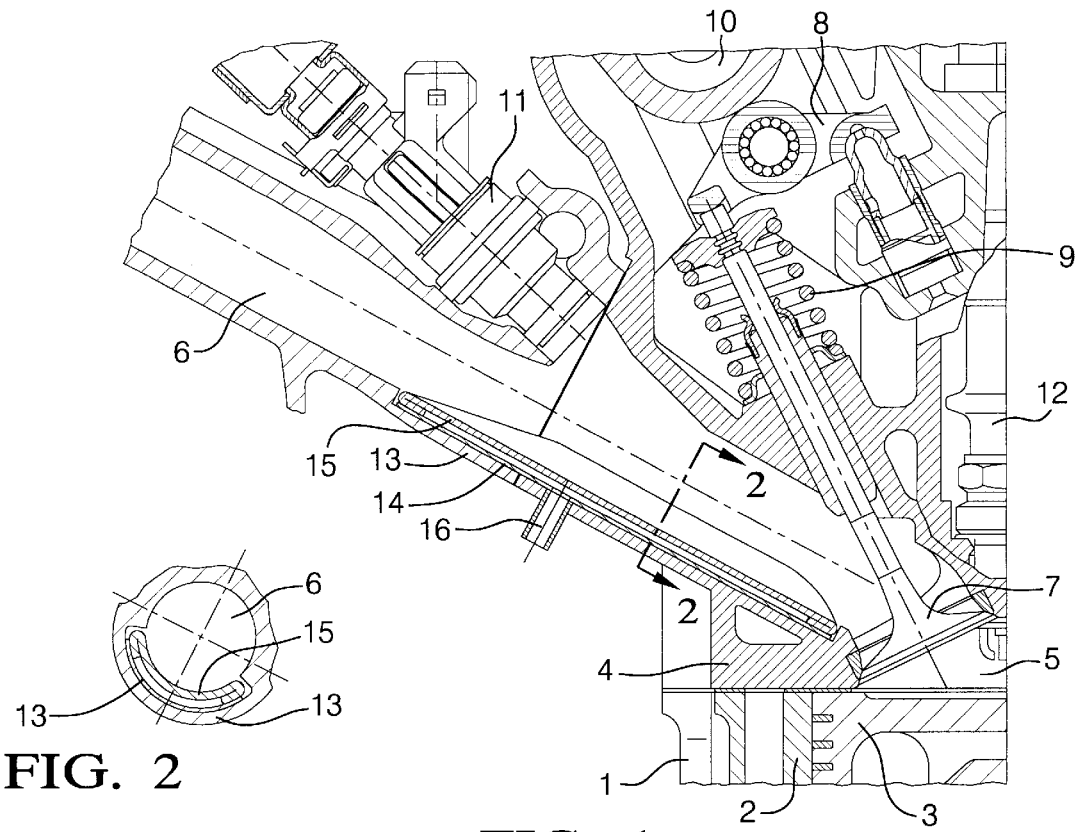
FIG. 2
FIG. 1
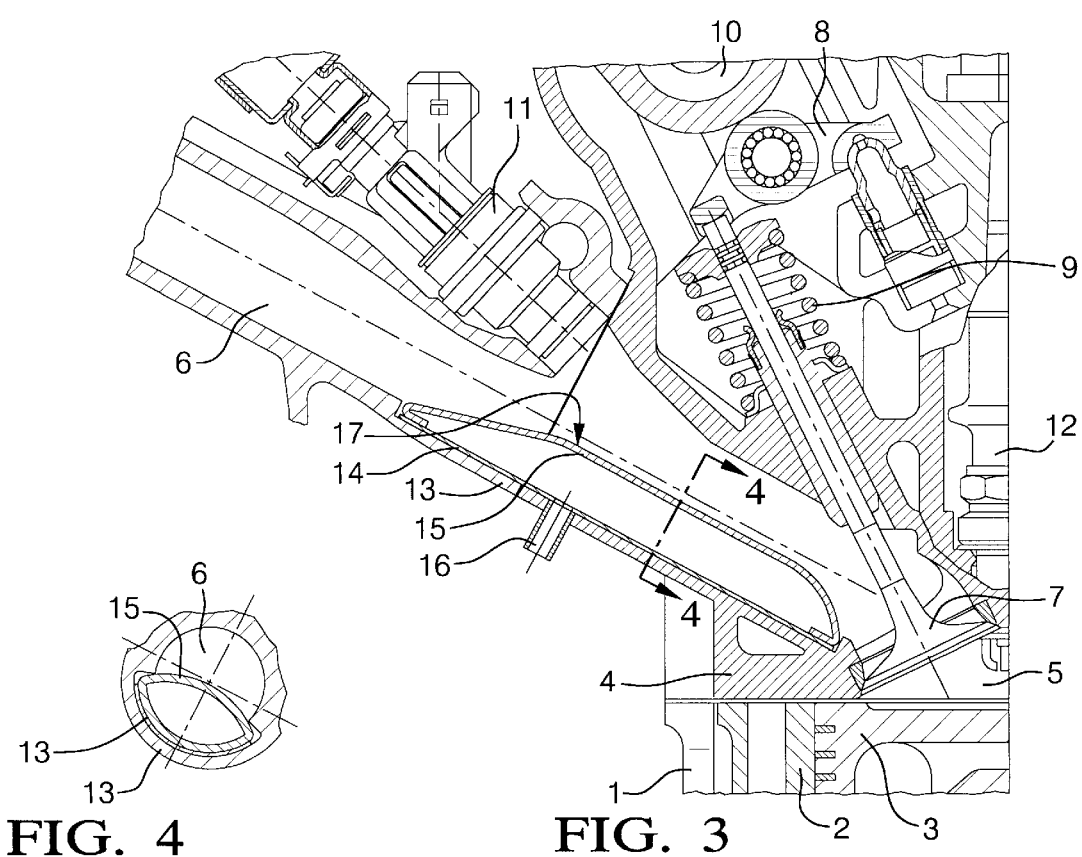
FIG. 4
FIG. 3

INTAKE PORT FOR AN INTERNAL COMBUSTION ENGINE

TECHNICAL FIELD

The invention concerns an intake port for a spark-ignited reciprocating internal combustion engine with means for altering the inflow direction of the gas guided in the intake port to the intake valve leading to a combustion chamber arranged at the end of the intake port.

BACKGROUND OF THE INVENTION

The purpose of such an intake port is to achieve in a selective manner a swirling motion of the cylinder charge in the combustion chamber in certain operating zones of the internal combustion engine and thus assure stable combustion, while during other operating states of the internal combustion engine such a swirling motion is undesirable and should be avoided.

Such an intake port is described in DE 93 19 545 U1. In this intake port the cross-section of the port is subdivided by a wall into two partial channels which combine to form an intake zone directly in front of the intake valve closing the combustion chamber of the internal combustion chamber. The wall forming a partial plane which runs at least in the intake zone transversely to the axis of the cylinder of the internal combustion engine, and the partial channels are provided with a controllable throttle flap.

Such an intake port has the disadvantage that the throttle flap additionally arranged in its partial cross-section even in the open state prevents the unimpeded passage of the gas, especially at high rpm of the internal combustion engine. This leads to undesired turbulence in the flow path and to losses of the degree of filling. Likewise, detached flow on the downstream edge of the wall separating the two partial channels is unavoidable so that losses in the degree of filling are also caused by this.

DE 41 35 271 A1 describes an intake pipe of an internal combustion engine in which, in order to adapt to the oscillating behavior of operation of the internal combustion engine, the cross-section of flow is varied by means of an elastic inflatable expansion body, said expansion body being designed in the form of a ring which concentrically alters the cross-section of flow. An influence on the inflow direction of the gas into the cylinder of the internal combustion engine is impossible according to the technical concept presented here.

SUMMARY OF THE INVENTION

The invention has the objective of improving an intake port of the type described in such a way that for any operating state of the internal combustion engine, by selectively influencing the flow, an optimal cylinder charge and in certain operating regions a swirling motion of the cylinder charge can be achieved in a selective way, therefore avoiding losses in the degree of filling as a result of undesired turbulence of the gas stream and thus assuring stable combustion.

The invention solves this problem with the features of claim 1. Advantageous variants of the invention are the subject of the subclaims.

The intake port according to the invention has only one, although variable, cross-section for any operating range of the internal combustion engine in which the gas stream can flow without disturbing internal structures such as throttle flaps or detachment edges. Only the direction of the intake flow to the intake valve can be altered by the asymmetrical arrangement according to the invention of a conventional inflatable expansion body on the form-stable wall of the port in such a way that a vortex is formed in the cylinder to the desired degree which optionally may be formed both perpendicular to the cylinder axis and also parallel to the cylinder axis as well as in an intermediate form.

Especially in the case of spark-ignited internal combustion engines with direct fuel injection by selective alignment of the charge vortex as a function of the engine parameters, a stable ignition and combustion behavior of the charge are assured.

BRIEF DESCRIPTION OF THE DRAWINGS

Examples of embodiment of the invention are described in the following with reference to drawings in which:

FIG. 1 is a partial section through the cylinder head of an internal combustion engine along the central axis of an intake port at the required high degree of cylinder filling;

FIG. 2 is a section along line 2—2 in FIG. 1;

FIG. 3 is a partial section of FIG. 1 with the expansion body expanded;

FIG. 4 is a section along line 4—4 in FIG. 3;

DESCRIPTION OF THE PREFERRED EMBODIMENT

Figure 5:
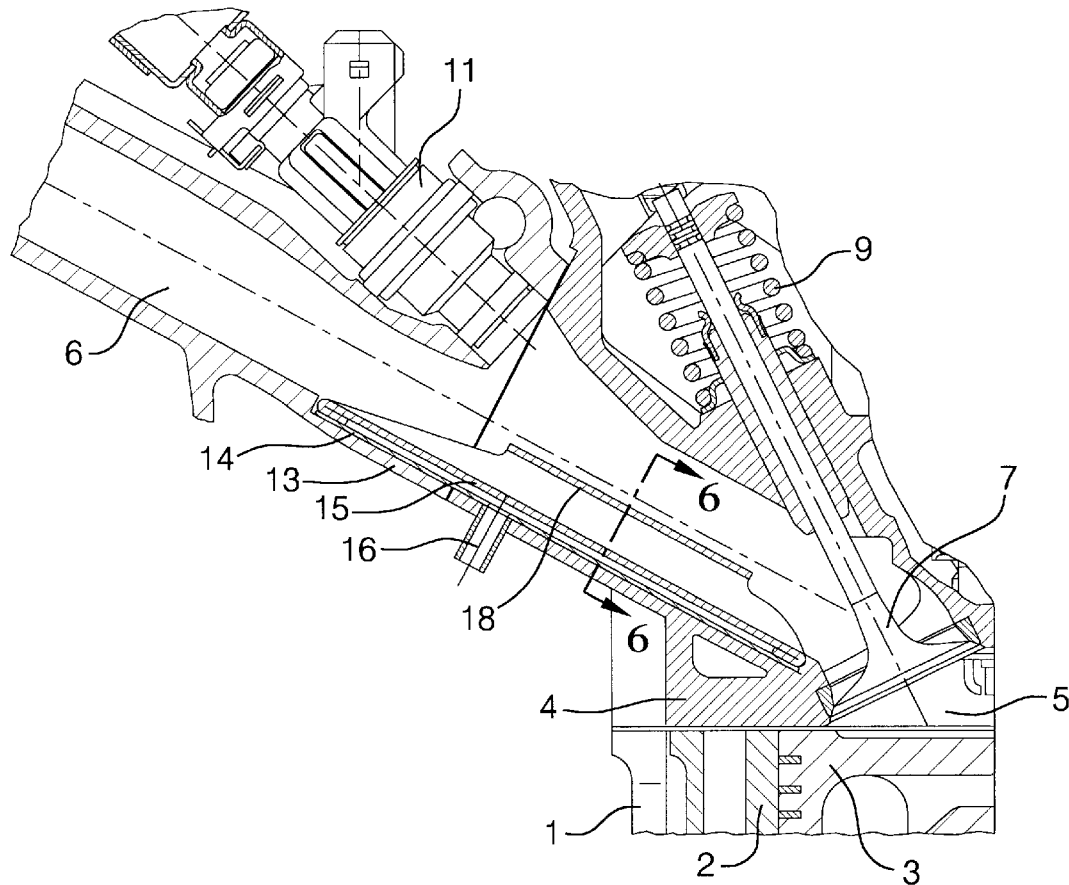
FIG. 5 is a partial section of the cylinder head of an internal combustion engine along the central axis of an intake port with a stop surface for the expansion body.

A cylinder block 1 of an internal combustion engine with cylinders 2 and pistons 3 is closed at the top by a cylinder head 4. Between the pistons 3 and the cylinder head 4, a combustion chamber 5 is formed. In the cylinder head 4 for each of the cylinders 2, an intake port 6 is situated which leads from an air filter (not shown) to an intake valve 7. The intake valve 7 is to be opened by a cam shaft 10 via a lifter arm 8 against the force of a valve closing spring 9. A fuel injection valve 11 is connected to the intake port 6. A spark plug 12 extends with its electrode into the combustion chamber 5. At the wall 13 of the intake port 6 is a flat supporting body 14. The latter carries an elastomer part 15 which is affixed gas-tight and liquid-tight to the supporting body 14 with its edges. The supporting body 14 is provided with an opening and a connecting piece 16 connected to it which extends through an opening in the wall of the intake port 6. To this connecting piece 16 a conduit (not shown) is connected which leads to an adjustable pressure source, e.g., a gas or liquid pump. The pressure of this pressure source is preferably controllable via a performance graph by the engine control unit as a function of the engine parameters. The supporting body 14 and the elastomer part 15 together form an expansion body which expands under pressure in its interior into the intake port 6.

When the connecting piece 16 is not charged with pressure, the elastomer part 15 lies flatly against the supporting body 14 because of its own elasticity so that the cross-section of the intake port 6 does not deviate from its essentially round shape (FIGS. 1 and 2). With increasing pressure on the connecting piece 16, the expansion body inflates and forms in the intake port 6 near the intake valve 7 a one-sided ramp 17 (FIG. 3) which asymmetrically alters the cross-section of the intake port 6 and with it deflects the gas stream in the intake port 6 in such a way that behind the intake valve 7 in the combustion chamber 5 a vortex is optionally formed. This vortex may be designed as a roll running perpendicular to the cylinder axis or also running parallel to the cylinder axis or as an intermediate form.

Figure 6:
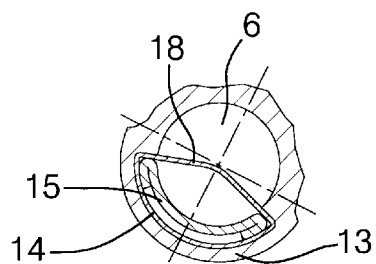
FIG. 6 is a section along line 6—6 in FIG. 5.

FIGS. 5 and 6 show a modified example of embodiment of the invention. The supporting body 14 in this case is connected to a stop 18 extending into the cross-section of the intake port 6 on which the elastomer part 15 rests when the expansion body is fully deflected. In this way, an exactly reproducible height of the ramp 17 upon full deflection of the expansion body is possible.

Figure 7:
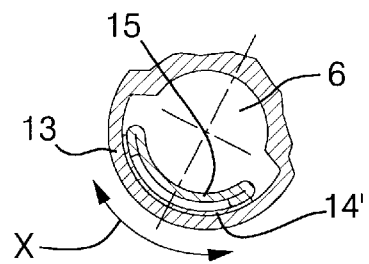
FIG. 7 is a section similar to the section in FIG. 2 of another example of embodiment.

Another modification of the invention is shown in FIG. 7 in which the supporting body 14' on its rest on the wall 13 of the intake port 6 can be swiveled in a controlled manner about the axis of the intake port 6 in the direction of the arrow X. By such a controlled swiveling motion of the supporting body 14' together with the elastomer part 15, the ramp 17 cannot only change the gas stream toward the intake valve 7 in one plane axially, but it can also change the inflow direction in several planes lying in the axis of the intake port 6. The sought-after swirling movement in the combustion chamber 5 can thus be influenced over a broad range of engine operation.

What is claimed is:

1. Inlet port for in particular a spark-ignition reciprocating-piston internal combustion engine with means for altering the direction of approach flow of the gas conducted in the inlet port to an inlet valve arranged at the end of the inlet port and closing off a combustion chamber, characterized in that the means are formed from an expansion body, which is arranged asymmetrically on a wall of the inlet port, and the expansion body is formed by a supporting body abutting against the wall of the inlet port and an elastomer portion connected to the latter at its edges gas-tightly and liquid-tightly, wherein a pressure medium can be introduced between the supporting body and the elastomer portion, controlled by a connection piece, and the expansion body forms a ramp by controlled expansion of its volume and so asymmetrically changes the cross-section of the inlet port.

2. Inlet port according to claim 1 characterized in that the inlet port further includes a stop, connected to the supporting body and extending into the cross-section of the inlet port and on which the elastomer portion rests when the expansion body is fully pressurized to provide a reproducible ramp height.

3. Inlet port according to claim 2 characterized in that the expansion body is slidable about the axis of the inlet port on the wall of the inlet port.

4. Inlet port according to claim 3 characterized in that the pressure medium used for controlled expansion of the expansion body is supplied as a liquid or gas by a pump whose pressure is determined by electronic control means as a function of the engine parameters or selected according to a performance graph.

* * * * *